United States Patent [19]
Tabatabaie-Raissi et al.

[11] Patent Number: 5,842,110
[45] Date of Patent: Nov. 24, 1998

[54] APPARATUS AND METHOD FOR PHOTOCATALYTIC CONDITIONING OF FUEL GAS FLY-ASH PARTICLES

[75] Inventors: Ali Tabatabaie-Raissi; Nazim Z. Muradov, both of Melbourne; Peter H. Peng, Heathrow, all of Fla.

[73] Assignee: University of Central Florida, Orlando, Fla.

[21] Appl. No.: 613,856

[22] Filed: Mar. 11, 1996

[51] Int. Cl.⁶ .................................................. B01J 19/08
[52] U.S. Cl. ........................................ 422/186.3; 422/900
[58] Field of Search .................................. 422/186.3, 900

*Primary Examiner*—Daniel J. Jenkins
*Attorney, Agent, or Firm*—Brian S. Steinberger

[57] ABSTRACT

A process for the in-situ transformation of chemical species present in the flue gas to form sulfur trioxide, wherein the fly-ash particles are conditioned by altering their surface electrical properties. More specifically, the subject invention is concerned with fly ash conditioning using plural lamps located at specific positions in a specific arrangements most advantageous to the chemical conversion that would take place. The novel invention conditions flue gas emissions by treating the flue gas with $SO_3$, where the $SO_3$ is generated in the flue gas by photocatalytic conversion of $SO_2$ using selectively spaced and arranged ultra violet light emitting lamps and related automated components. A preferred embodiment of the invention describes the novel process with a large-scale flue gas emission plant having an electrostatic precipitator(ESP) and flue gas stack where a novel feedback control system operates the various UV lamps by measuring power output of the ESP and an opacity sensor for the plume being emitted from the stack.

6 Claims, 9 Drawing Sheets

Circuit diagram for turning UV lamps on/off using an inexpensive operational amplifier and a relay

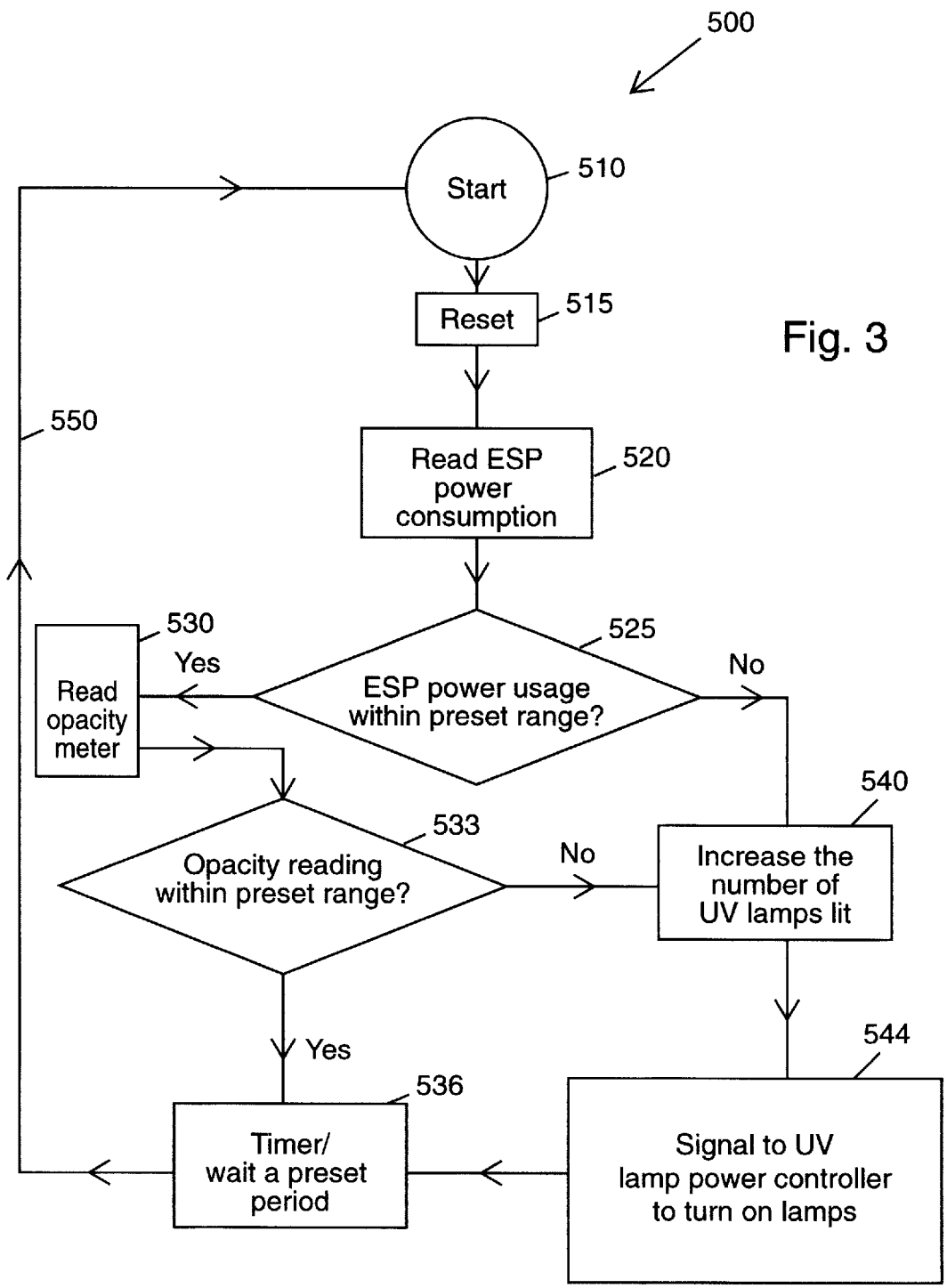
Operational logic of the photo catalytic ash conditioning system

APPARATUS AND METHOD FOR PHOTOCATALYTIC CONDITIONING OF FUEL GAS FLY-ASH PARTICLES

This invention relates to conditioning of flue gas fly-ash, and in particular to conditioning the gas emissions by treating the flue gas with $SO_3$, where the $SO_3$ is created in the flue gas by photocatalytic conversion of $SO_2$ using selectively spaced and arranged ultra violet light (wave lengths of approximately 254 nm or shorter) emitting lamps and related automated components.

BACKGROUND AND PRIOR ART

Coal-fired power plants have long been known to cause acid rain and atmospheric pollution. It has been well known that to reduce these undesirable forms of pollution, the power plants have been forced to reduce ambient sulfur dioxide emissions. This reduction of emissions has been accomplished by either switching to low-sulfur coal or using various flue gas desulfurization(FGD) processes to reduce emissions from high-sulfur coals.

Most power plants utilizing high-sulfur coal(i.e. 3% by weight sulfur) employ either throw-away or regenerative processes. Throw-away processes involve various limestone injection or scrubbing techniques(dry or wet). They produce gypsum as a by-product which must be disposed of properly. Regenerative processes use sodium hydroxide scrubbing which is regenerated, resulting in sulfur dioxide which may be sold as such or converted to sulfuric acid. These processes are all expensive to build and operate. Thus, utilities often switch from high to low-sulfur coal(containing less than 1% by weight sulfur) in order to reduce sulfur dioxide emissions. However, using low sulfur coal confronts power plant operators with additional problems. When low-sulfur coal is burned, the fly-ash produced is too resistive. Thus, electrostatic precipitators(ESPs) that are designed to operate with fly-ash originating from high-sulfur coal burners do not work. In the new plants, the use of ESPs designed for the low-sulfur coal fly-ash would be very large in size and uneconomical.

Other solutions to these problems involve sulfur trioxide injection into the flue gas after the boiler and before the electrostatic precipitator. Ammonia injection or a combination of ammonia and sulfur trioxide have also been used. This process has been referred to as fly-ash conditioning or flue gas conditioning. Most fly-ash is composed of silica and alumina mixed with other metal oxides. Any polar compound which is sufficiently reactive and able to change the surface properties will render the ash less electrically resistive. While sulfur trioxide injection can condition the flue gas and decrease fly-ash resistivity to a level comparable to that obtained when high sulfur coal is used, the process is expensive. Either liquid sulfur dioxide or elemental sulfur is required. A catalytic reactor is needed to convert the sulfur dioxide to sulfur trioxide. The catalyst($V_2O_5$) life is limited, so that it must be periodically replenished. Ultra-high purity sulfur and filtered air must be used for a trouble-free operation. Sulfur must be kept molten, therefore, steam-jacketed piping is required. Systems in which sulfur oxides and water are present inevitably invite corrosion and require constant attention and maintenance. In-line spare pumps and air blowers are also necessary. These components result in expensive plant installation to generate sulfur trioxide as needed.

Several U.S. patents have been concerned with the ultra-violet treatment of flue-gases. For example, the photolytic oxidation of sulfur dioxide to sulfur trioxide, aided by UV radiation is demonstrated in U.S. Pat. Nos. 3,984,296 to Richards; 4,097,349 to Zenty; and 5,138,175 to Kim et al. The patents above teach flue gas treatment by a well-known photochemical process involving UV radiation to generate highly oxidizing species that attack target molecules in the flue gas. They may differ on the postulated reaction mechanisms, but they all claim to be processes that remove or help remove gaseous pollutants from the flue gases. However, none of the patents discussed above describe methods based on hydroxyl radical reaction engineering and photosystem design. None of these prior art references describe the importance of using water or water vapor solutions in a treatment process and most importantly and fundamentally, they do not claim interactions with fly ash.

U.S. Pat. No. 4,097,349 to Zenty describes oxidation of $NO_x$, $SO_2$, and hydrocarbons with UV radiation having a wavelength of from 240 nanometers to 340 nanometers. Equation 17 of the Zenty 4,097,349 patent depicts the absorption of 290–340 nanometers UV radiation to generate a singlet $^1SO_2$. Equation 18 of the Zenty patent describes the absorption of 340–400 nanometer UV radiation by $SO_2$ to produce triplet $^3SO_2$. According to Zenty, through a series of steps, the singlet excited $^1SO_2$ can be transformed to the triplet state, $^3SO_2$. The excited triplet state can be chemically quenched with another species present in the gas stream such as nitrogen, oxygen, water, carbon dioxide, carbon monoxide, ozone, methane, and other hydrocarbons. Zenty's patent is essentially based on the aforementioned photo-processes and their consequences in photo-oxidation of $NO_x$ and $SO_2$. The Zenty patent does not describe any specific mechanisms such as: free radical chain reactions, in general, and hydroxyl radical formation, in particular. For example, Zenty discusses the importance of hydroxyl radical (OH·) reactions (column 2, lines 65–68). In the presence of moisture, hydroxyl radical reactions dominate $SO_2$ conversion, as shown in equations 13–16 of the Zenty patent. Fundamentally, the Zenty process does not deal with fly ash conditioning.

U.S. Pat. No. 3,984,296 to Richards describes a process for the reduction of sulfur and nitrogen oxide contaminants in effluent gas streams. Richards' patent teaches the formation of electron donor-acceptor molecular complexes (EDA complexes) in the flue-gas by exposure to lewis acids or bases generated electrostatically within a corona precipitator. Also, Richards describes a photochemical technique for the production of the EDA complexes using infrared radiation of 400 to 1,000 nanometers or UV radiation of 120–240 nanometer wavelengths.

Furthermore, Richards describes a technique for photo-induced oxidation of the EDA complexes and reaction of $SO_2$ and $NO_x$ molecules with EDA constituent of stack gas. Richards describes using UV light having a wavelength of 150–500 nanometers between 300–400 nanometers to promote photo-oxidation of EDA complex. Richards suggests that free radical reactions may occur due to UV exposure (column 8, lines 12–15). A careful examination of the Richards patent reveals that (Table of column 9, lines 1–21) the underlying reaction mechanisms required for practicing his patent are similarly limited to those disclosed by Zenty as reactions 17–19 of U.S. Pat. No. 4,097,349. Again, Richards does not deal with fly-ash.

U.S. Pat. No. 5,138,175 to Kim, et al. describes irradiation of gas mixtures such as combustion gases and flue-gases to facilitate removal of sulfur and nitrogen oxide contaminants. Kim et al. demonstrates $SO_2$ can be efficiently removed from flue-gases given sufficient exposure to UV light and presence of adequate amounts of oxygen and water. As far as the photo chemistry is concerned, this patent describes a method for the reduction of sulfur and nitrogen oxides in a gas mixture through UV radiation induced generation of ground state (zero charge atomic) oxygen and subsequent attack of such ground state $O_2$ upon $SO_2$ and $NO_x$. Kim et al., further discloses that a source of radiation having a wavelength of, most desirably, below 220 nanometers installed within a dust-occluding air pressure window device located within the flue-gas stream. What is claimed by Kim, et al., is essentially a sheath design useful for in-situ treatment of flue-gas $SO_2$ and $NO_2$.

The device supposedly extends the operating life of the lamp and to protect the surfaces of the lamp from fouling.

The patents above teach flue gas treatment by a known photochemical process involving UV radiation to generate highly oxidizing species that attack target molecules in the flue gas. They may differ on the postulated reaction mechanisms, but they all claim to be processes that remove or help remove gaseous pollutants from the flue gases. More importantly, none of the patents discussed above methods and apparatus based on hydroxyl radical reaction engineering and photosystem design.

Several U.S. patents involve in-situ flue-gas fly-ash conditioning and involve techniques for sulfur trioxide injection. U.S. pat. Nos. 3,993,429 to Archer; 4,333,746 to Southam; 5,320,052 to Spokoyny et al. ; 5,350,441 and 5,196,038 to Wright; 5,229,077 to Bell et al. and U.S. Pat. Nos. 4,966,610 and 5,122,162 to Krigmont et al. (1992) involve various applications to control the addition of a reagent based on measurements of the feedstream and rely on sulfur trioxide injection components along with using Electrostatic Precipitators (ESP) components. However, none of these patents provides for the in-situ transformation of chemical species present in flue gas to form sulfur trioxide for conditioning fly ash.

SUMMARY OF THE INVENTION

The first objective of the present invention is to provide a technique for the in-situ transformation of chemical species already present in flue gas to form small amounts of sulfur trioxide(less than approximately 10% conversion) for conditioning fly ash.

The second object of this invention is to provide a technique that forms sulfur trioxide for conditioning fly ash in coal flue gas without artificially injecting sulfur trioxide into the flue gas.

The third object of this invention is to provide a method of altering the surface electrical properties of fly ash particles in order to condition the fly ash without the injection of chemicals.

The fourth object of this invention is to provide selectively spaced and positioned ultraviolet lamps to maximize generation of the vapor-phase free radical oxidizing species and minimizing mass transfer effects and optimum conditioning of fly-ash particles without the injection of chemicals.

The fifth object of this invention is to condition flue gas containing fly-ash in-situ prior to the treating the flue gas in an electrostatic precipitator. A preferred method of in-situ conditioning fly-ash particles produced by a coal burning power plant includes depositing water vapor and other polar compounds on surface of the fly-ash particles in-situ, wherein the deposition alters electrical resistivity of the particles while photocatalytically converting a small percentage of $SO_2$ in the flue gas to $SO_3$ by subjecting the flue gas to mercury vapor UV lamps. The $SO_2$ conversion is in the range of 2% to 15%, and prefereably in the range of 5% to 10%. The UV lamps can be connected in parallel. Each UV lamp can have a diameter of approximately, d, a vertical spacing between adjacent UV lamps of approximately d to 2d, and a horizontal spacing between the adjacent UV lamps of approximately d to 3d, where d can be approximately ⅝ inch to 2 inches. Each UV lamp can further include an angle, $\phi$, of approximately 80 degrees. A large scale preferred embodiment allows for conditioning the flue gas prior to feeding the conditioned flue gas into an electrostatic precipitator(ESP), and then to a stack for expelling the ESP treated flue gas. The large scale embodiment further can include a feedback loop for controlling the turning on and turning off of selected UV lamps. The feedback loop includes a power meter for measuring the power output of the ESP, an opacity sensor for measuring the particulate content in the final atmosphere expelled flue gas, and a computer for controlling each of the UV lamps based on these measurements. The computer can further operate a rheostat for controlling the brightness of each of the UV lamps.

The subject invention does not rely on injection of sulfur trioxide. The subject inventors have disclosed an in-situ transformation of chemical species present in the flue gas to form sulfur trioxide and condition the fly-ash particles by altering their surface electrical properties. More specifically, the subject invention is concerned with fly ash conditioning using plural lamps located at specific positions in a specific arrangements and the chemical conversion that would take place.

Further objects and advantages of this invention will be apparent from the following detailed description of a presently preferred embodiment which is illustrated schematically in the accompanying drawings.

BRIEF DESCRIPTION OF THE FIGURES

FIG. 3 is a flow chart depicting the operational logic steps of the preferred embodiment of FIG. 2C.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The subject invention is directed to condition the fly-ash particles via hydroxyl radical reactions. Fly-ash consists of fine solids entrained in the flue-gas. What is meant by conditioning is changing the surface properties of the fly-ash particles by deposition and nucleation of strongly polar compounds on the surface in sufficient amounts to alter the electrical resistivity of the particle. This invention does not aim at removing and/or scrubbing gaseous pollutants such as $NO_2$ or $SO_2$ from flue gases, although a small amount of pollutants will also be removed.

The subject invention takes advantage of the photolytic reaction chemistry and, more importantly, the large effect of moisture (water vapor) present in the flue gas on the hydroxyl radical photo-reactions of importance to ash conditioning. It has been found by the inventors that destruction by photolysis is an order of magnitude slower than by OH· radical attack. Table 1 depicts, the relative oxidizing power of hydroxyl radical is highest among all trans-halogen oxidants, surpassed only by fluorine.

TABLE 1

Relative oxidation power of oxidizing species.

| Species | Oxidation potential (volts) | Relative oxidation power (based on Cl = 1) |
|---|---|---|
| F | 3.06 | 2.25 |
| OH• | 2.80 | 2.05 |
| atomic oxygen | 2.42 | 1.78 |
| $O_3$ | 2.07 | 1.52 |
| $H_2O_2$ | 1.77 | 1.30 |
| $HO_2$• | 1.70 | 1.25 |
| permanganate | 1.70 | 1.25 |
| hypochlorous acid | 1.49 | 1.10 |
| Cl | 1.36 | 1.00 |

The subject invention focuses on the means to increase hydroxyl radical concentration by improved photo-system design and optimization. The OH· radical concentration distribution directly tied to the light intensity profile (irradiance distribution) of the UV lamps. Moreover, the presence of water vapor is thought to be primarily responsible for the observed high $SO_2$ conversion efficiencies by increasing the OH· radical concentration of the flue-gas stream.

An important aspect of this invention is that fly-ash present in the flue gas provides catalytic surface. Small amounts of semiconductor metal oxide surfaces present in fly-ash (e.g. ferric oxide) act in a manner similar to titania, enhancing the conversion efficiency of the UV reactions, resulting in a fast and economical process.

Figure 1A:
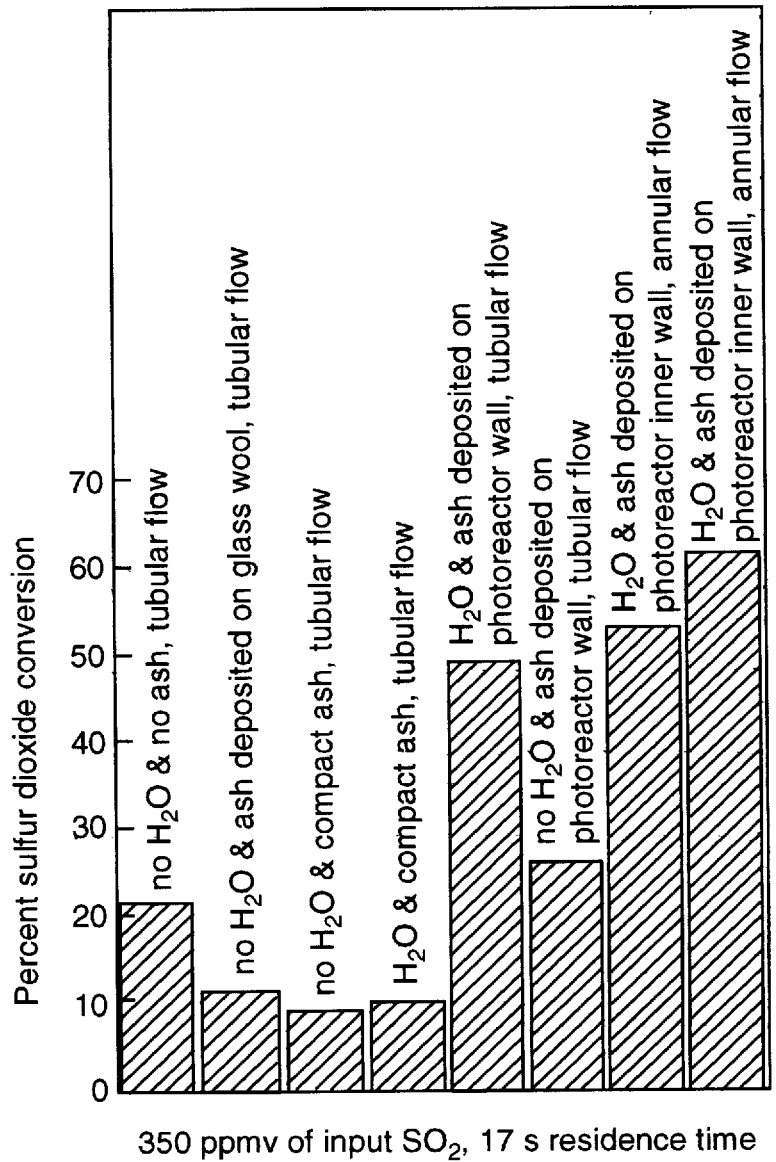
FIG. 1A is a graph representing the photolytic conditioning of fly-ash and the effect of moisture using a 16 W UV lamp.

At the Florida Solar Energy Center (FSEC), the inventors have verified, through laboratory-scale tests, the fact that the conversion of sulfur dioxide to sulfur trioxide occurs by UV irradiation. Bench-scale tests, conducted at FSEC, used a sample of fly-ash from the Crystal River power plant near St. Petersburg, Fla. FIG. 1A depicts results from the laboratory experiments conducted at FSEC. FIG. 1A is a graph representing the photolytic conditioning of fly-ash and the effect of moisture using a 16 W UV lamp. A description is given below.

Figure 1B:
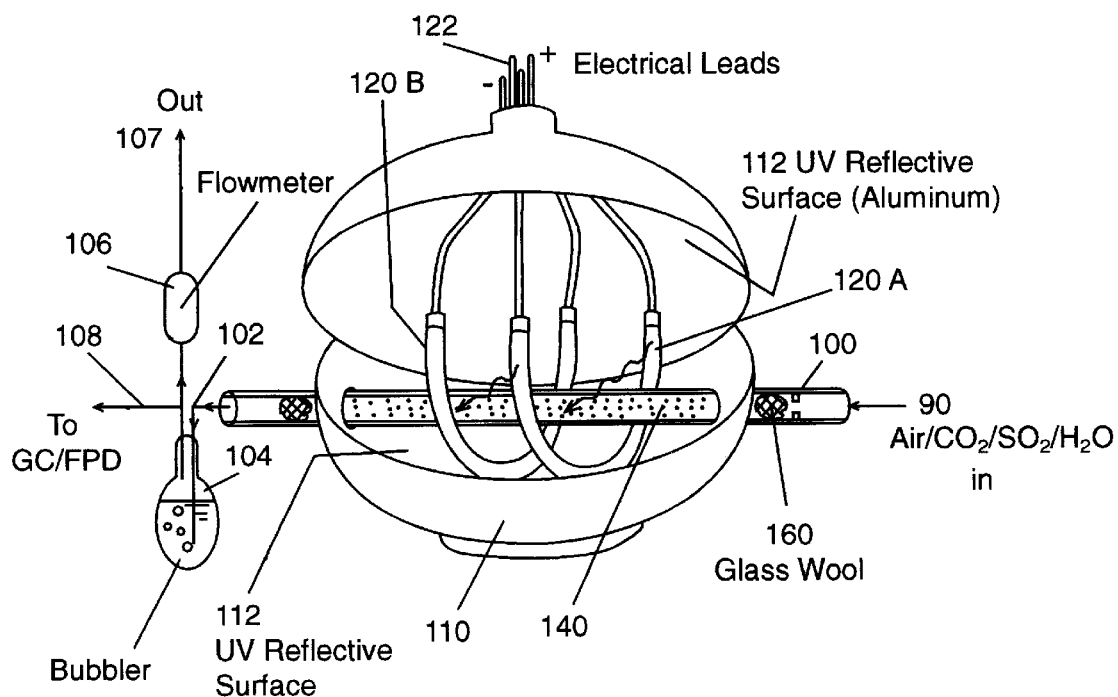
FIG. 1B illustrates the laboratory set-up for demonstrating the effect represented in FIG. 1A of the photolytic conditioning of fly-ash and moisture using a 16 W UV lamp.

FIG. 1B illustrates the laboratory set-up for demonstrating the effect of moisture using a 16 W UV(ultra violet) lamp. A quartz tube photoreactor 100 having a 12 mm OD(outer diameter), 10 mm ID(inner diameter) and 220 mm length was placed within an enclosed UV light chamber 110 which was connected to a bubbler 104 and flowed to an external ambient location 107 through a flowmeter 106 and to a Gas Chromatograph with flame photometric detector(GC/FPD) 108. Inner surfaces 112 of chamber 110 had UV reflective surfaces such as but not limited to aluminum and the like. UV illumination was provided by one of two 16 W low-pressure mercury lamps (120A, 120B) located within the light chamber 110 connected by leads 122 to an external electrical power supply 124. To simulate the condition of fly-ash in the flue gas, several arrangements of the quartz tube photoreactor 100 were employed. Air, carbon dioxide ($CO_2$), sulfur dioxide($SO_2$) and water($H_2O$) are introduced into the quartz tube photoreactor at position 90 for these arrangements.

Figure 1C:
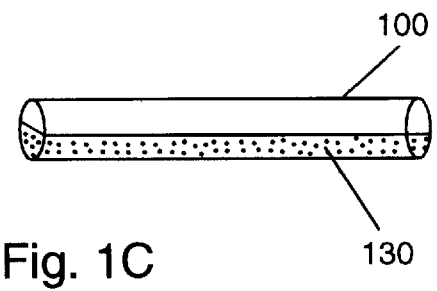

In the first arrangement, a layer of compacted ash 130 shown in FIG. 1C filled lower half of the photoreactor 100 was used, and the results are depicted by the "compact ash" notation in FIG. 1A. The "compact ash" arrangement had approximately a ten percent (10%) sulfur dioxide conversion.

The second arrangement includes the set-up of FIG. 1B where a very thin layer of ash 140 was deposited on the inner wall of the quartz tube 100, thus the "wall ash" notation of FIG. 1A. In this arrangement, incoming radiation is filtered by the wall ash limiting gas-particle-photon interactions. In an actual case, UV lamps can be placed within exhaust gas ductwork, directly illuminating the gas and entrained particles.

Figure 1D:
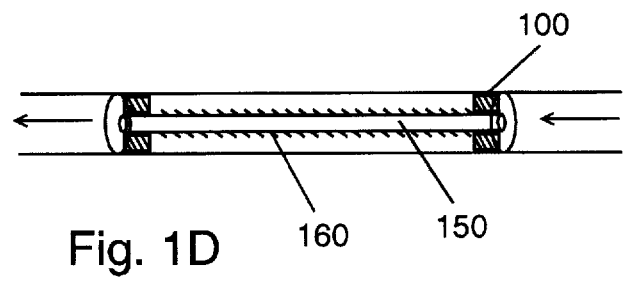
Figure 1E:
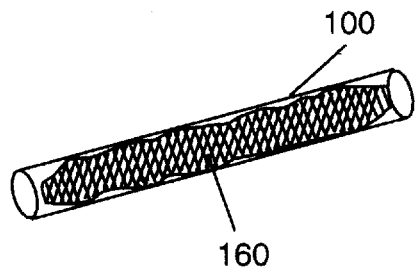

The third configuration of the tube 100 is shown in FIG. 1D. Here, an annular reactor configuration the inner Pyrex glass rod 150 has an OD of 6 mm with rod 150 placed coaxially within outer quartz tube 100. A thin layer of ash was deposited on the outer surface of the inner glass rod 150. We also tried to simulate ash conditions within the stack by dispersing $TiO_2$ particles throughout a piece of glass wool 160 placed within the quartz reaction tube 100. Using glass wool 160 did not prove very useful as extensive UV filtering by the glass wool did occur.

The results of the laboratory tests in FIG. 1A indicated that sulfur dioxide conversions occurred well above 60% (at a residence time of 17 s). From such rate information, it should be possible to achieve 7–10% $SO_2$ conversion with residence time of only a second or so.

Presence of fly-ash can also enhance $SO_2$ conversion and most importantly, the presence of moisture results in much higher conversions. This demonstrates that the reaction mechanism involves hydroxyl radical formation which renders the photocatalytic oxidation much more efficient compared with the externally generated sulfur trioxide as practiced in the present state-of-the-art ash-conditioning systems.

It is clear from the description above and the background information presented that the sulfur trioxide produced is immediately adsorbed by or reacted with the fly-ash and not emitted from the stack.

Although the hydroxyl radical formation and concentration within the photo-system is not affected by the gas stream advection, the flow (velocity) field does affect the extent of particulate contamination and adhesion on the lamp surface. Further, when chemical reaction rates are in the same order of magnitude as the gas stream advection/residence times, the species concentration are affected by the velocity field and the extent of turbulence and recirculation in the photo-system. For flow passing a cylinder (depicting UV lamp cross section), streamlines separate or break away from the rear forming a pulsating wake behind the cylinder.

The character of this wake is dependent on the numerical value of the dimensionless speed called the Reynolds number Re of the flow. For large Reynolds numbers, the wake becomes very disorderly. The alternating vortices shed into the wake are called von Kannan vortex streets. At higher Reynolds numbers, the vortex pattern disappears, and the wake become turbulent.

By proper arrangement of the lamps, i.e. their number and relative distance to each other, an optimum photo-system having the most uniform light intensity distribution and highest $SO_2$ conversion is obtained.

Figure 2A:
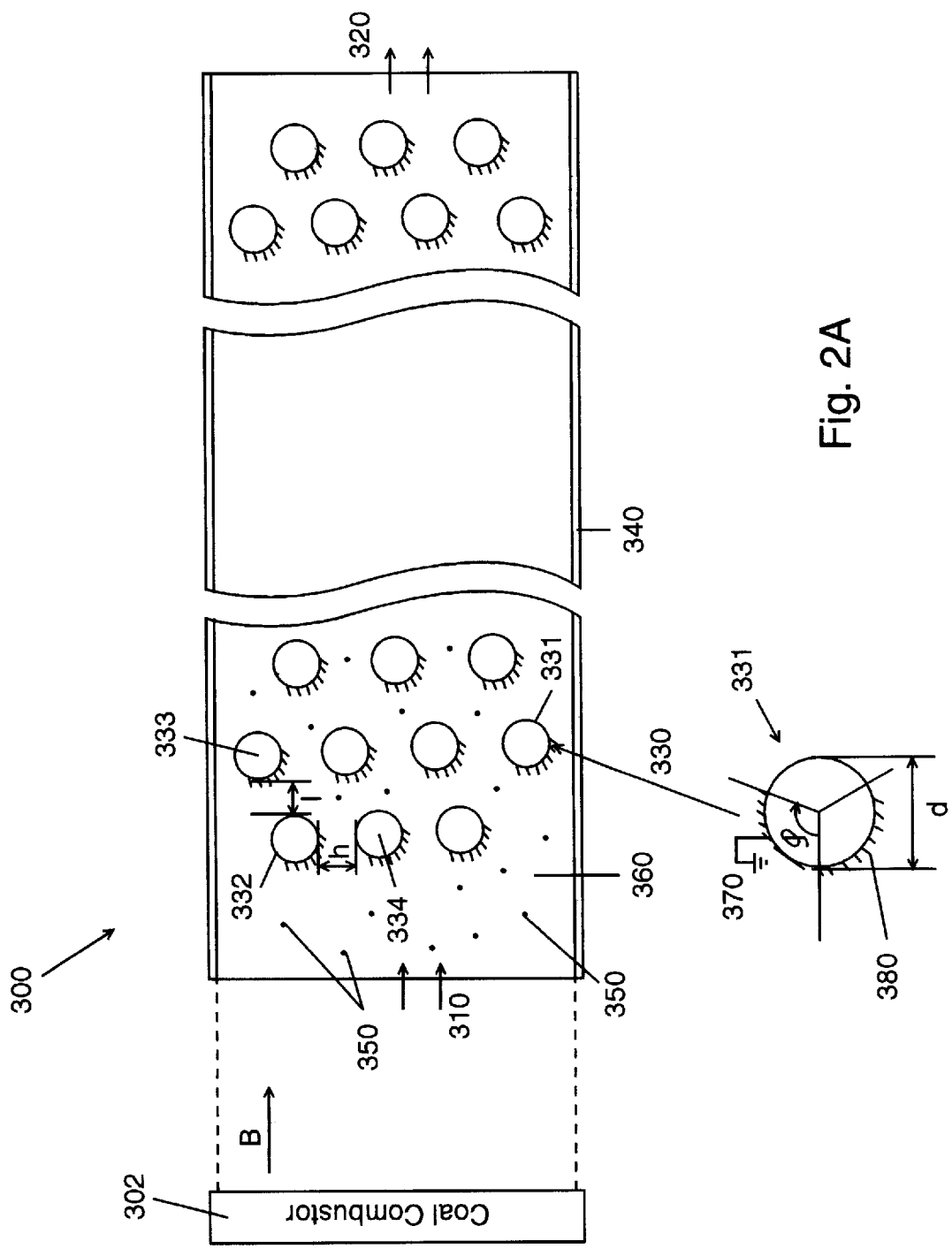
FIG. 2A depicts a cross-sectional view of a preferred light source assembly for in-situ flue-gas fly-ash conditioning.
Figure 2B:
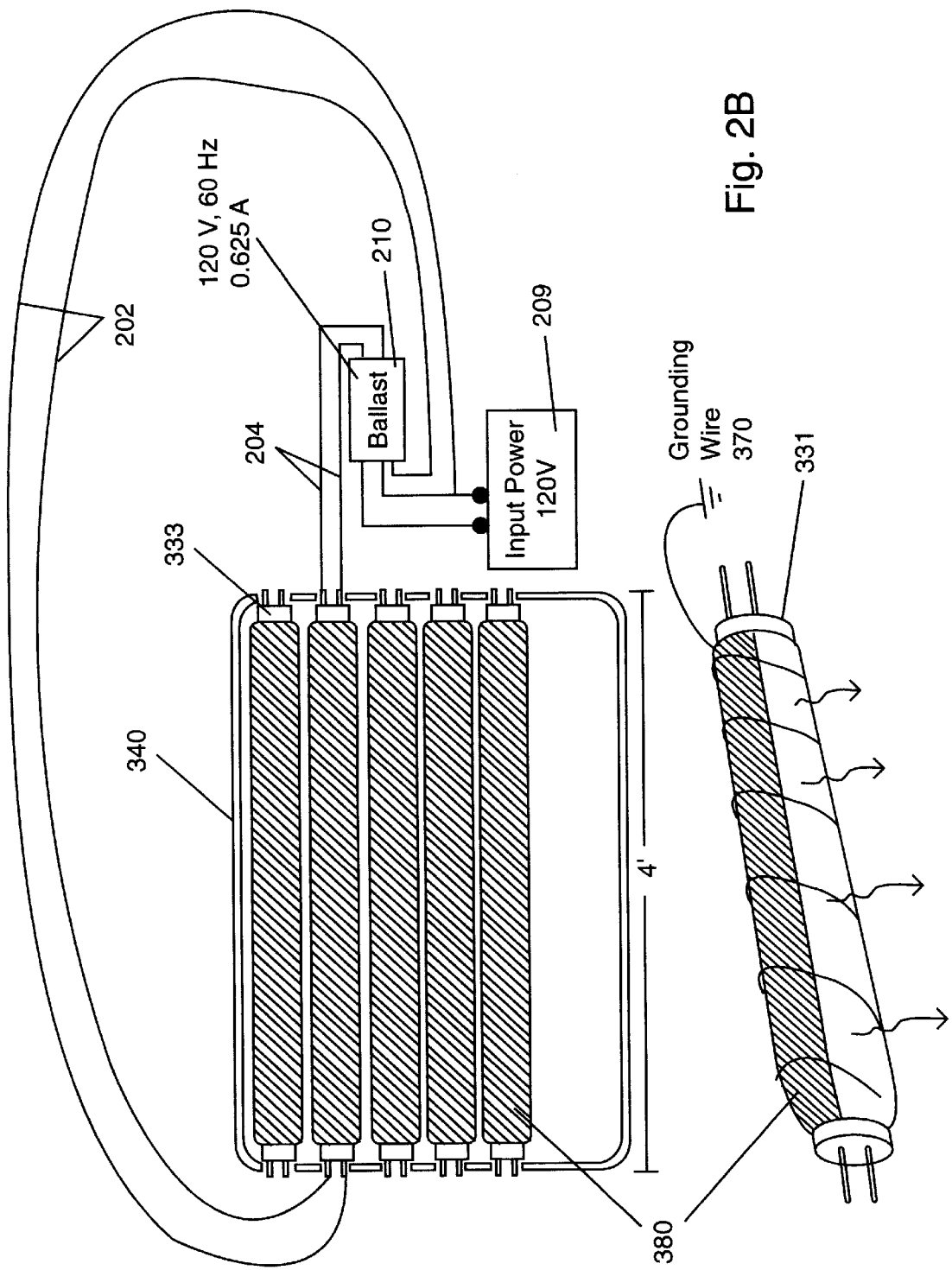
FIG. 2B depicts a side view of the preferred light source assembly of FIG. 2A along arrow B.

FIG. 2A depicts a cross-sectional view 300 of a preferred light source assembly for in-situ flue-gas fly-ash conditioning. FIG. 2B depicts a side view of the preferred light source assembly of FIG. 2A along arrow B. Referring to FIGS. 2A–2B, the embodiment 300 has fly-ash 350 with exhaust gases 360 entering an exhaust ductwork 340 from a coal combustor 302 in the direction of arrow B. In-situ conditioning of the fly-ash 350 with $SO_2$ occurs by passing the fly-ash 350 in the ductwork along arrow 310 by Ultra-Violet (UV) light. Individual lamps 331 have lead wires 202, 204 connected to ballast 210 such as but not limited to 120 V, 60 Hz, 0.625 A such as the one shown in FIG. 2D and connected to main power supply 209 (i.e., 120 volt). The UV light comes from the low pressure mercury vapor lamps 330 which are positioned horizontally against the incoming gases 360 and 350. Any number of commercially available low-pressure or medium/high-pressure mercury vapor lamps having approximately one to five foot length, such as but not limited to Voltarc's G36T6—Ultra V Base and GE 40BL lamps or others such as Model #Philips HOK 140/120, HTQ14 or Hanovia 6850A431 lamps. A single UV lamp 331 contains an external reflective coating 380 that can include an aluminum surface having a diameter, d. The lamp 331 has a grounded shield at 370 which is the same as coating 380. Angle φ is approximately 80 degrees. This angle designates the angular positions on the cylindrical surface in a cross flow at which flow separation occurs.

The lamps are separated from one another by a vertical height, h, represented between lamps 332 and 334 of FIG. 2A. The height, h, has a value of approximately d to 2d. The lamps can further be separated by a length, 1, represented between lamps 332 and 333. Length, 1, can have a value of between approximately d and 3d. Arrow 320 represents the direction of conditioned flue gas having passed through embodiment 300. The unit d, can range from approximately ⅝ inches to approximately 2 inches. The total number of lamps used is a function of the flue gas flow rate, the concentration of the $SO_2$ and the particulate matter and ash particles within the ductwork.

From the laboratory measurements, the inventors have discovered that residence times of few seconds are needed to achieve approximately 7 to approximately 15% conversion of $SO_2$ to $SO_3$ for fly-ash conditioning, using a 16 W low-pressure mercury lamp. For a typical power plant of 500 MW capacity, the gas flow rate is roughly 4,890,000 m³/hr (cubic meters per hour) or 1358 m³/s(cubic meters per second). Assuming a residence time of 1 s, requires 1360 m³ of reaction volume for full conditioning of the flue gas. This corresponds to duct work dimensions of approximately 25' by 25' by 75' volume. The total number of UV lights required depends on the lamp type and quantum efficiency of $SO_3$ formation. Thus, if 25 ppmv of $SO_3$ is needed, approximately 1.3875 mol/s of sulfur trioxide conversion will be needed. For large-scale applications, the use of high-pressure mercury vapor lamps will be more advantageous. With electrical to photon efficiency of about 35% and quantum efficiency of $SO_3$ formation of 30%, roughly 10% of a lamp's power input will be useful. Assuming an average photon energy of about 500 kJ, approximately 6.61 MW of power will be required to reform 1.3875 mol/s of $SO_3$ in the flue gas in order to accomplish ash conditioning. This corresponds to about 1.32% of the plant output power generated.

Figure 2C:
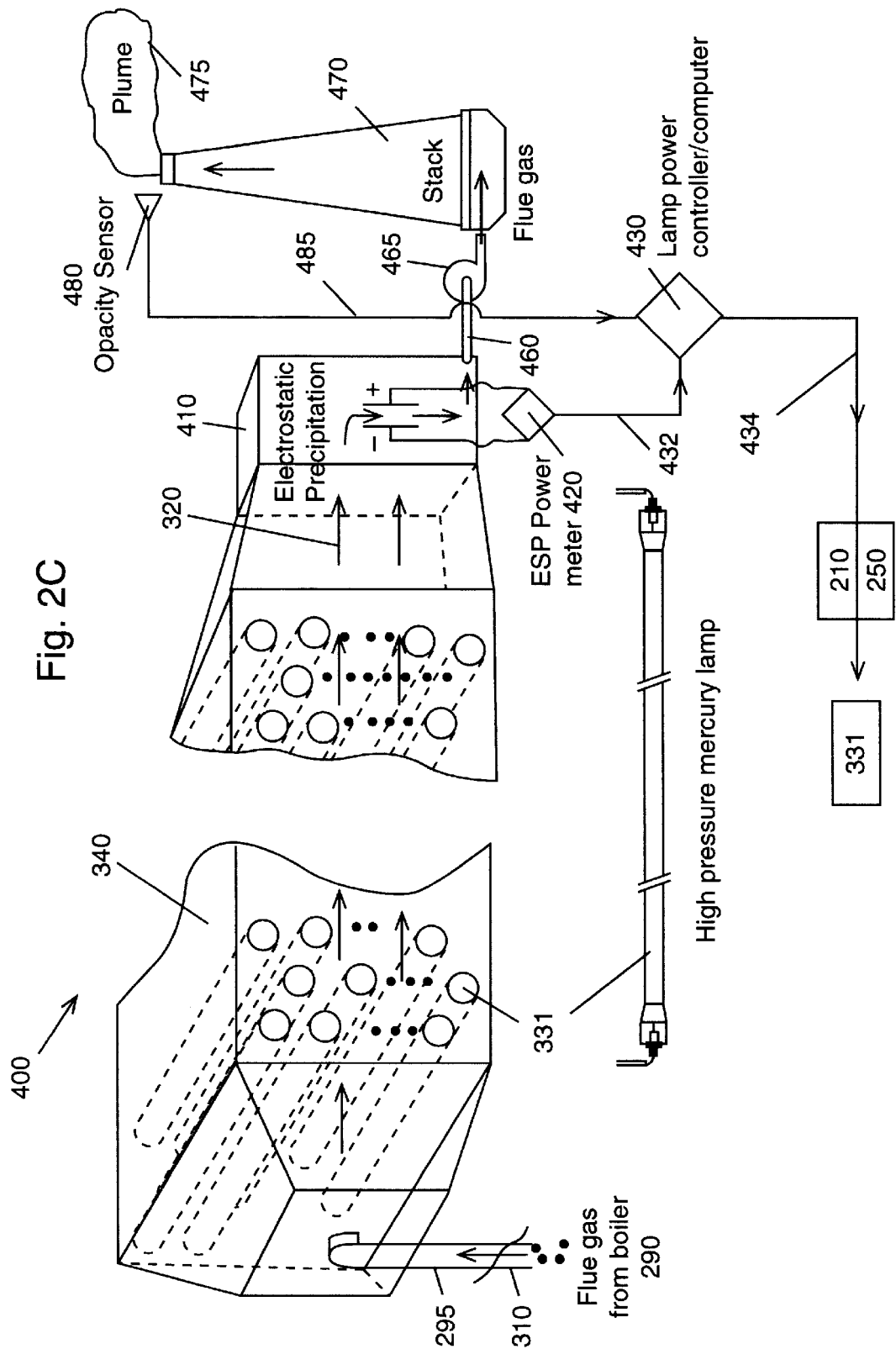
FIG. 2C is a perspective view of the minimal components and circuitry to run high-pressure mercury vapor lamps suitable for large-scale fly-ash conditioning applications with a novel feedback operation.
Figure 2D:
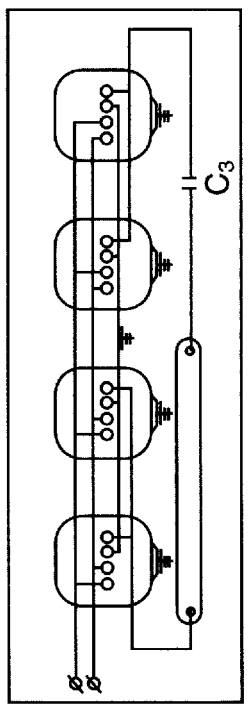
FIG. 2D shows a conventional wiring diagram for constant wattage ballast used in FIGS. 2A–2C.
Figure 2E:
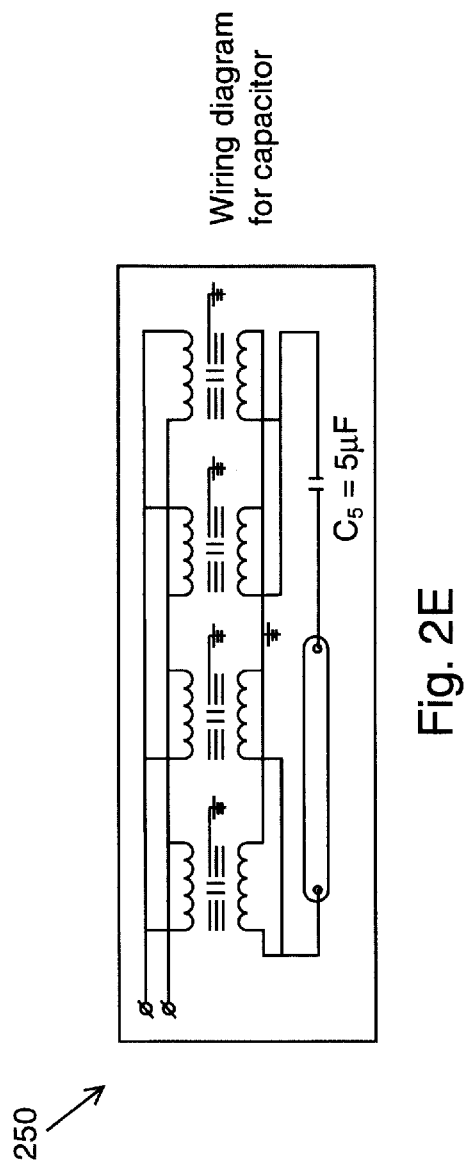
FIG. 2E shows a conventional wiring diagram for a capacitor used in FIGS. 2A–2C.

FIG. 2C is a perspective view of a preferred embodiment 400 to run high-pressure mercury vapor lamps 331 suitable for large-scale fly-ash conditioning applications using the components of FIGS. 2A–2B in a novel feedback operation. Flue gas 310 containing fly-ash and exhaust gasses(such as 350, 360 discussed previously) from a boiler 290 enters via pipe 295 into ash conditioning photo-duct 340 (also described previously in relation to FIGS. 2A–2B). Duct 340 contains UV lamps 331 with a total output power capable of producing $SO_3$ levels needed for proper ash conditioning. FIG. 2D shows a conventional wiring diagram for constant wattage ballast used in FIGS. 2A–2C. FIG. 2E shows a conventional wiring diagram for a capacitor used in FIGS. 2A–2C. FIGS. 2D and 2E represent schematics of a commercially available high-pressure mercury vapor lamp circuitry for the Philips model HTQ-14, 4 kW lamp, of which the circuitry is nonessential subject matter which is incorporated by reference. Other appropriate UV lamps include Philips model HOK series with output power exceeding 17 kW.

Figure 2F:
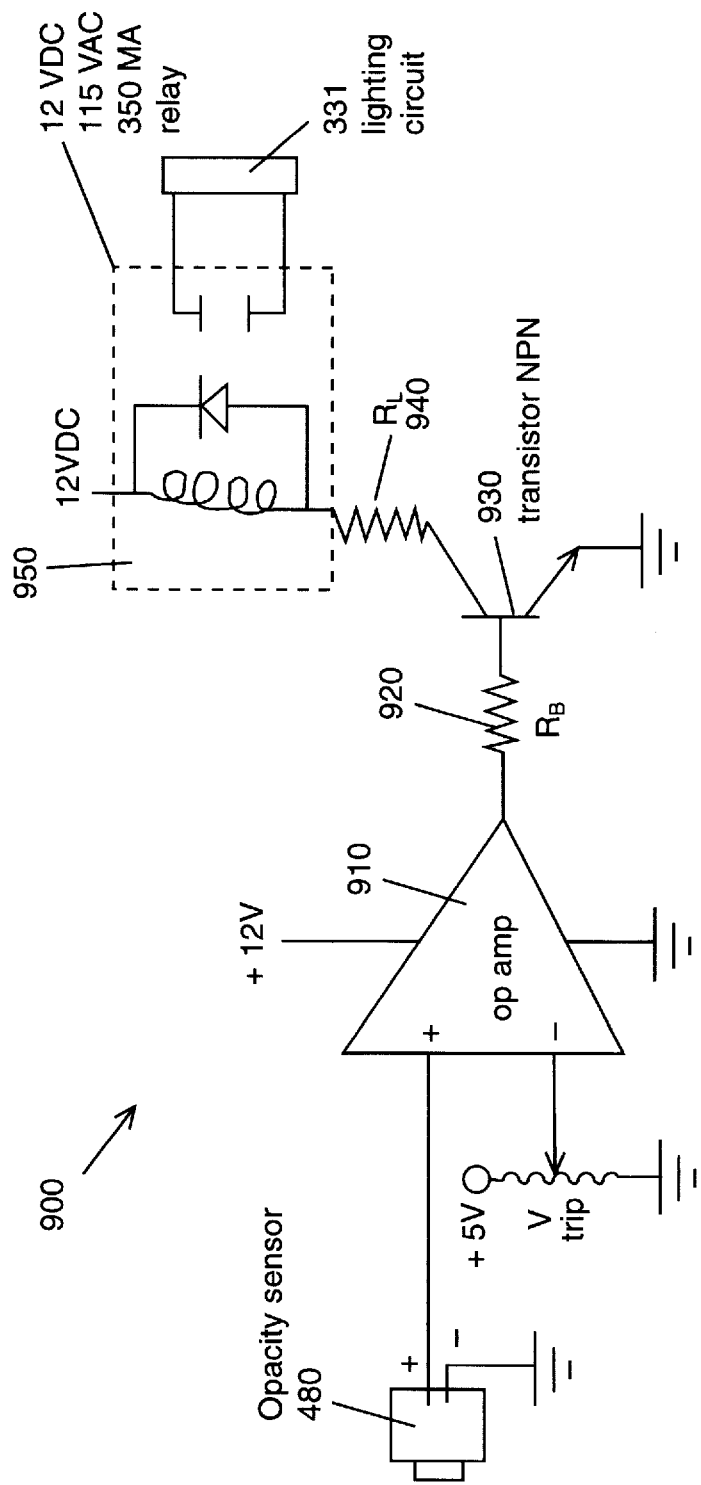
FIG. 2F illustrates a circuit for turning the UV lamps of FIG. 2C on and off.

Referring again to FIGS. 2C–2E, conditioned flue gas 320 passes to a conventional electrostatic precipitator(ESP) 410 (such as the ones described in the background section above). A ESP power meter 420 picks up power signals in kW (kilowatts) from ESP 410 to lamp power controller/computer 430. The opacity sensor 480 is a light beam device that detects the amount of transmitted light being blocked by an exhaust plume 475. The opacity sensor 480 can be an off-the-shelf component such as but not limited to a Datatest single or double pass opacity sensors model #1000 MPS, 1000 MPD or 900 RMD. Conditioned gas from ESP 410 passes through lines 460, 465 into an emitting stack 470 and finally dispensed into the atmosphere as a plume 475. Opacity sensor 480 measures and passes signals to the lamp power controller/computer 430. Output signals 432, 485 from the electrostatic precipitator electrodes power sensor 420 and an opacity sensor 480 installed on stack 470 are processed by a computer controller 430 that regulates total output photonic power within the photo-duct as a feedback to meet the requirements of ash conditioning as the process conditions change. The computer 430 used for controlling the UV lamps can be an IEEE 488 Board and an IBM compatible 586, with a National Instrument Systems data acquisition and control board. The controlling can be done by turning on or off the appropriate number of UV lamps 331 which are used to accomplish ash conditioning in the duct work 340. FIG. 2F illustrates an optional circuit 900 for turning on and off UV lamps 331 which includes opacity sensor 480 connected to an OP-AMP voltage divider 910, through resistor 920(approximately 500–1000 ohms, preferably 720 ohms), to a semiconductor switch 930 such as 5 an NPN transistor and resistor 940(approximately 10–100 ohms, preferably 55 ohms) through a 12 VDC, 115 VAC, 350 mA relay 950 to control the turning on and off of lamps 331. All lamps 331 are connected in parallel and each require a capacitor 210 FIG. 2D and a constant wattage ballast 250 shown in FIG. 2E. Ballast 250 and capacitor 210 can be an off-the-shelf Philips 4XVG3/HTQ Ballast with 5 $\mu$ farad capacitor, and are nonessential subject matter which are incorporated by reference. The lamp power controller/computer 430 can be further utilized to control rheostat type switches for adjusting the brightness and effective fly-ash conditioning effects of the individual UV lamps 331 in the system 400. Optionally the invention can substitute medium/high pressure mercury vapor lamps, such as Model #Philips HOK140/120, HTQ14 or Hanovia 6850A431 lamps have a built-in rheostat type power modulator for varying and controlling the intensity of each of the lamps, instead of the mercury vapor lamps 331 previously discussed.

FIG. 3 shows a flow chart depicting the operational feedback logic steps of the preferred embodiment of FIG. 2C. The system is started 510 and reset 515 on each pass. From the reset 515, the computer 430 of FIG. 2C reads the ESP power consumption 520 to determine if ESP power usage is within preselected ranges 525. If the answer is no the next step is to increase the number of UV lamps that are lit, 540, followed by signaling to UV lamp power controller 430 to turn on the lamps 331, shown by step 544. Next a timer 536 restarts the beginning of the flow chart measuring after a preselected time period 536. If ESP power usage is determined at step 525 to be within a preset range, then step 520 occurs where the opacity meter is read. The next step is determining whether the opacity reading is within a preset range at step 533. If the answer from step 533 is no the next step is 540, if the answer is yes the system passes to step 536, and so forth.

In all flue gas treatment methods the objective is a substantial reduction in the concentration of the flue gas contaminants, most desirably at 90% levels. Thus, for $SO_2$ treatment, a conversion efficiency of at least 90% would be most desirable. Unlike processes aimed at the treatment of the flue gas constituents, fly-ash conditioning only requires approximately a 5% to 10% $SO_2$ conversion.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An apparatus for conditioning flue gas emissions by treating the flue gas with $SO_3$, where the $SO_3$ is formed in-situ in the flue gas by photocatalytic conversion of $SO_2$ using selectively spaced ultraviolet (UV) light emitting lamps, comprising:

a source for allowing flue gas having fly-ash and $SO_2$ gases to flow into a duct; and vertical and horizontal adjacent Ultra-Violet(UV) lamps arranged and positioned in a cross flow in the duct, each lamp having a diameter of approximately, d, the vertical adjacent UV lamps being spaced apart to one another at approximately d to 2d, and the horizontal adjacent UV lamps being spaced apart at approximately d to 3d, and d being equal to approximately 5/8 of an inch to approximately 2 inches, wherein $SO_3$ is formed in-situ in the flue gas by photocatalytic conversion of $SO_2$.

2. The apparatus for conditioning flue gas emissions of claim 1, wherein each UV lamp further includes:

an angle, $\phi$, of approximately 80 degrees to an outer cylindrical surface in a cross-flow at which flow separation occurs.

3. The apparatus for conditioning flue gas emissions of claim 1, wherein each UV lamp further includes:

a mercury vapor UV lamp.

4. An apparatus for conditioning flue gas emissions by treating the flue gas with $SO_3$, where the $SO_3$ is formed in-situ in the flue gas by photocatalytic conversion of $SO_2$ using selectively spaced ultraviolet (UV) light emitting lamps, comprising:

a source for allowing flue gas having fly-ash and $SO_2$ gases to flow into a duct; and vertical and horizontal parallel Ultra-Violet(WV) lamps arranged and positioned in a cross flow in the duct and each of the lamps spaced apart from one another a distance d, and d being equal to approximately 5/8 of an inch to approximately 2 inches, wherein $SO_3$ is formed in-situ in the flue gas by photocatalytic conversion of $SO_2$.

5. The apparatus for conditioning flue gas emissions of claim 4, wherein the parallel lamps further include:

a vertical spacing in the duct between adjacent UV lamps of approximately d to 2d.

6. The apparatus for conditioning flue gas emissions of claim 4, wherein the parallel lamps further include:

a horizontal spacing in the duct between adjacent UV lamps of approximately d to 3d.

* * * * *

UNITED STATES PATENT AND TRADEMARK OFFICE
CERTIFICATE OF CORRECTION

PATENT NO. : 5,842,110

DATED : Nov. 24, 1998

INVENTOR(S) : Tabatabaie-Raissi, et al.

It is certified that error appears in the above-identified patent and that said Letters Patent is hereby corrected as shown below:

On the title page, insert following: item [56] reference cited:

| | | |
|---|---|---|
| 3,387,941 | 06/11/68 | MURPHY, ET AL. |
| 3,869,362 | 03/04/75 | MACHI, ET AL. |
| 3,984,296 | 10/05/76 | RICHARDS |
| 4,004,995 | 1/25/77 | MACHI, ET AL. |
| 4,097,349 | 6/27/78 | ZENTY |
| 4,152,120 | 5/01/79 | ZAVITSANOS, ET AL. |
| 4,288,389 | 9/08/81 | SPRINGMANN |
| 4,333,746 | 6/08/82 | SOUTHAM |
| 4,401,553 | 8/30/83 | FAUDEL |
| 4,966,610 | 10/30/90 | KRIGMONT, ET AL. |
| 5,122,162 | 6/16/92 | KRIGMONT, ET AL. |
| 5,138,175 | 8/11/92 | KIM, ET AL. |
| 5,186,916 | 2/16/93 | NEVELS |

UNITED STATES PATENT AND TRADEMARK OFFICE
CERTIFICATE OF CORRECTION

PATENT NO. : 5,842,110
DATED : Nov. 24, 1998
INVENTOR(S) : Tabatabaie-Raissi, et al.

It is certified that error appears in the above-identified patent and that said Letters Patent is hereby corrected as shown below:

| | | |
|---|---|---|
| 5,196,038 | 3/23/93 | WRIGHT |
| 5,229,077 | 7/20/93 | BELL, ET AL. |
| 5,320,052 | 6/14/94 | SPOKOYNY, ET AL. |
| 5,350,431 | 9/27/94 | YAMASHITA |
| 5,350,441 | 9/27/94 | WRIGHT |

"Flue Gas Conditioning for Power Boilers" William E. Archer, WAHLCO, INC., Santa Ana, CA "Coal fired, 580-MW cycling plant logs successful first year" Reprinted from Electric Light & Power, Sept. Copyright Technical Publishing, a division of Dun-Donnelley Publishing Corporation (1981)

"Operating Experience With Flue Gas Conditioning Systems at Commonwealth Edison Company" L.L. Weyers, Commonwealth Edison Company, Chicago, IL (presented at the EPA Third Symposium on the Transfer and Particulate Control Technology, March 1981, Orlando, Florida)

"$SO_3$ Conditioning to Enable Electrostatic Precipitators to Meet Design Efficiencies" J.J. Ferrigan III, Wahlc Ana, California (presented at the EPA Third Symposium on the Transfer and Utilization of particulate Cont Technology, March 1981, Orlando, Florida)

"$SO_3$ Conditioning for Improved Electrostatic Precipitator performance Operating on Low Sulfur Coal" J.J. J.D. Roehr, Wahlco, Inc., Santa Ana, California 92704 (Proceedings of the Symposium on the Transfer and Particulate Control Technology/1979, Denver, Colorado, Sponsored by the Environmental Protection Agenc

UNITED STATES PATENT AND TRADEMARK OFFICE
CERTIFICATE OF CORRECTION

PATENT NO. : 5,842,110
DATED : Nov. 24, 1998
INVENTOR(S) : Tabatabaie-Raissi, et al.

Page 3 of 3

It is certified that error appears in the above-identified patent and that said Letters Patent is hereby corrected as shown below:

"Method and Cost Analysis of Alternative Collectors for Low Sulfur Coal Fly Ash" by Edgar W. Breisch/Sale Engineer/Wahlco, Inc. (Proceedings of the Symposium on the Transfer and Utilization of Particulate Contro Technology/1978, Denver, Colorado, Sponsored by the Environmental Protection Agency)

"Flue Gas Conditioning with $SO_3$ to Improve Precipitator Performance" James H. Brennan, Project Engineer, Edison Company and Robert L. Reveley, Vice President, Wahlco, Inc. (Proceedings of the American Power Conference/1977)

"Flue Gas Conditioning to Reduce Size and Costs of a New Precipitator at Public Service Company of Colorad Station Unit No. 1" H.G. Brines, Supervisor, Environmental Engineering Services, Public Service Company of R. L. Reveley, Vice President, Wahlco, Inc. (Proceedings of the American Power Conference/1978)

"Flyash conditioning update" William E. Archer, Wahlco, Inc. (Power Engineering, June 1977, Volume 81, N 78, Copyright 1977 by Technical Publishing Company)

Signed and Sealed this

Eleventh Day of May, 1999

*Attest:*

*Attesting Officer*

Q. TODD DICKINSON

*Acting Commissioner of Patents and Trademarks*

UNITED STATES PATENT AND TRADEMARK OFFICE
CERTIFICATE OF CORRECTION

Page 1 of 1

PATENT NO.      : 5,842,110
APPLICATION NO. : 08/613856
DATED           : November 24, 1998
INVENTOR(S)     : Ali Tabatabaie-Raissi et al.

It is certified that error appears in the above-identified patent and that said Letters Patent is hereby corrected as shown below:

On the title page item (54) and col. 1, line 1,
The correct title should read: APPARATUS AND METHOD FOR PHOTOCATALYTIC CONDITIONING OF FLUE GAS FLY-ASH PARTICLES.

Col. 1, line 4, insert:
--STATEMENT REGARDING FEDERALLY SPONSORED RESEARCH OR DEVELOPMENT This invention was made with government support under the DOD/Navy/NSWC, federal contract number N0017491C0161. The government has certain rights in this invention.--.

Signed and Sealed this
Twenty-sixth Day of April, 2011

David J. Kappos
*Director of the United States Patent and Trademark Office*